United States Patent
Nijhuis et al.

(10) Patent No.: US 7,201,934 B2
(45) Date of Patent: Apr. 10, 2007

(54) DISPERSIBLE COCOA PRODUCTS

(75) Inventors: Theo Nijhuis, Wormer (NL); Todd W. Gusek, Crystal, MN (US); Bassam F. Jirjis, Savage, MN (US); Ian C. Purtle, Plymouth, MN (US)

(73) Assignee: Cargill, Incorporated, Wayzata, MN (US)

( * ) Notice: Subject to any disclaimer, the term of this patent is extended or adjusted under 35 U.S.C. 154(b) by 529 days.

(21) Appl. No.: 10/271,313

(22) Filed: Oct. 15, 2002

(65) Prior Publication Data

US 2004/0071858 A1  Apr. 15, 2004

(51) Int. Cl.
    *A23G 1/00* (2006.01)
(52) U.S. Cl. ............ 426/631; 426/417; 426/593; 426/285; 554/9
(58) Field of Classification Search ............ 426/285, 426/593; 554/9
    See application file for complete search history.

(56) References Cited

U.S. PATENT DOCUMENTS

| | | |
|---|---|---|
| 1,721,858 A | 7/1929 | Eddy |
| 1,802,533 A | 4/1931 | Reid |
| 1,849,886 A | 3/1932 | Rosenthal |
| 2,247,851 A | 7/1941 | Rosenthal |
| 2,281,865 A | 5/1942 | Van Dijck |
| 2,538,007 A | 1/1951 | Kester |
| 2,548,434 A | 4/1951 | Leaders |
| 2,560,935 A | 7/1951 | Dickinson |
| 2,564,409 A | 8/1951 | Rubin |
| 2,682,551 A | 6/1954 | Miller |
| 2,727,914 A | 12/1955 | Gastrock et al. |
| 3,027,257 A * | 3/1962 | Shenkenberg ............ 426/285 |
| 3,053,663 A * | 9/1962 | Donahue ............ 426/93 |
| 3,085,879 A * | 4/1963 | Wadsworth et al. ............ 426/99 |
| 3,261,690 A | 7/1966 | Wayne |
| 3,560,218 A | 2/1971 | Whelan |
| 3,754,928 A | 8/1973 | Haney |
| 3,923,847 A | 12/1975 | Roselius et al. |
| 3,939,281 A | 2/1976 | Schwengers |
| 3,966,981 A | 6/1976 | Schultz |
| 3,966,982 A | 6/1976 | Becker et al. |
| 3,985,607 A | 10/1976 | Schmitt |
| 3,987,138 A | 10/1976 | Hege |
| 4,156,030 A | 5/1979 | Eggen |
| 4,156,743 A | 5/1979 | Schmitt |
| 4,164,594 A | 8/1979 | Jackson et al. |
| 4,281,027 A | 7/1981 | Inoue et al. |
| 4,331,695 A | 5/1982 | Zosel |
| 4,343,818 A | 8/1982 | Eggen |
| 4,349,579 A | 9/1982 | Raboud et al. |
| 4,375,387 A | 3/1983 | deFilippi et al. |
| 4,406,778 A | 9/1983 | Borza et al. |
| 4,424,112 A | 1/1984 | Rendall |
| 4,434,028 A | 2/1984 | Eppig et al. |
| 4,438,681 A | 3/1984 | Raboud et al. |
| 4,444,798 A | 4/1984 | Magnolato et al. |
| 4,504,503 A | 3/1985 | Biernoth et al. |
| 4,522,707 A | 6/1985 | Kriegel et al. |
| 4,547,292 A | 10/1985 | Zarchy |
| 4,554,170 A | 11/1985 | Panzner et al. |
| 4,617,177 A | 10/1986 | Schumacher |
| 4,633,775 A | 1/1987 | Kruiver |
| 4,675,133 A | 6/1987 | Eggers et al. |
| 4,675,198 A | 6/1987 | Sevenants |
| 4,744,926 A | 5/1988 | Rice |
| 4,765,257 A | 8/1988 | Abrishamian et al. |
| 4,770,780 A | 9/1988 | Moses |
| 4,784,866 A | 11/1988 | Wissgott |
| 4,797,198 A | 1/1989 | Wetzel et al. |
| 4,848,918 A | 7/1989 | Kingsley et al. |
| 4,861,607 A | 8/1989 | Margolis et al. |
| 4,877,530 A | 10/1989 | Moses |
| 4,898,673 A | 2/1990 | Rice et al. |
| 4,948,600 A | 8/1990 | Zumbé et al. |
| 5,009,917 A | 4/1991 | Wiant et al. |
| 5,041,245 A | 8/1991 | Benado |
| 5,114,730 A | 5/1992 | Ellis |
| 5,139,799 A | 8/1992 | Palson et al. |
| 5,178,889 A | 1/1993 | Reed et al. |

(Continued)

FOREIGN PATENT DOCUMENTS

BE          775206 A          11/1971

(Continued)

OTHER PUBLICATIONS

Minifie, B. W. 1980. Chocolate, Cocoa and Confectionery:Science and Technology 2nd edition., AVI Publishing Co., Inc., Westport, CT. p. 52, 54-57, 68, 69.*

(Continued)

*Primary Examiner*—Carolyn Paden
(74) *Attorney, Agent, or Firm*—Foley & Lardner, LLP; Edward L. Levine; Charles G. Carter

(57) ABSTRACT

An improved method for increasing the dispersibility of cocoa powder which has been treated with liquid solvent extraction procedures to reduce fat content. A dispersing agent such as lecithin is added to wet cocoa mass comprising remaining cocoa butter and remaining solvent from the liquid extraction. The residual solvent improves the uniformity of mixing between the cocoa mass and the dispersing agent.

64 Claims, No Drawings

U.S. PATENT DOCUMENTS

| | | | |
|---|---|---|---|
| 5,186,817 A | 2/1993 | Paspek et al. | |
| 5,210,240 A | 5/1993 | Peter et al. | |
| 5,258,199 A | 11/1993 | Moore et al. | |
| 5,281,732 A | 1/1994 | Franke | |
| 5,312,635 A | 5/1994 | Kazlas et al. | |
| 5,338,554 A | 8/1994 | Vogt et al. | |
| 5,389,394 A | 2/1995 | Weyersbach et al. | |
| 5,405,633 A | 4/1995 | Heidlas et al. | |
| 5,408,924 A | 4/1995 | Arendt et al. | |
| 5,445,841 A | 8/1995 | Arendt et al. | |
| 5,482,633 A | 1/1996 | Muraldihara et al. | |
| 5,516,923 A | 5/1996 | Hebert et al. | |
| 5,518,754 A | 5/1996 | Miller et al. | |
| 5,525,746 A | 6/1996 | Franke | |
| 5,554,645 A | 9/1996 | Romanczyk, Jr. et al. | |
| 5,616,359 A | 4/1997 | Heidlas et al. | |
| 5,620,728 A | 4/1997 | Langley et al. | |
| 5,626,756 A | 5/1997 | Heidlas et al. | |
| 5,707,673 A | 1/1998 | Prevost et al. | |
| 5,712,305 A | 1/1998 | Romanczyk, Jr. et al. | |
| 5,718,937 A | 2/1998 | Heidlas et al. | |
| 5,728,851 A | 3/1998 | Franke | |
| 5,739,364 A | 4/1998 | Franke | |
| 5,753,296 A | 5/1998 | Girsh | |
| 5,783,243 A | 7/1998 | Benado | |
| 5,919,502 A | 7/1999 | Manez et al. | |
| 6,015,913 A | 1/2000 | Kealey et al. | |
| 6,066,350 A * | 5/2000 | Purtle et al. | 426/430 |
| 6,111,119 A | 8/2000 | Trout | |
| 6,172,246 B1 | 1/2001 | Franke | |
| 6,248,910 B1 | 6/2001 | Franke | |
| 6,361,814 B2 * | 3/2002 | Purtle et al. | 426/430 |
| 6,610,343 B2 * | 8/2003 | Purtle et al. | 426/430 |
| 6,749,752 B2 | 6/2004 | Trout | |
| 2002/0127316 A1 | 9/2002 | Trout | |
| 2004/0071847 A1 | 4/2004 | Jirjis et al. | |
| 2004/0071848 A1 | 4/2004 | Gusek et al. | |

FOREIGN PATENT DOCUMENTS

| | | |
|---|---|---|
| CA | 840382 | 4/1970 |
| CA | 1 219 764 A | 3/1987 |
| CA | 1219764 A | 3/1987 |
| CA | 2059829 A1 | 7/1992 |
| CA | 2165387 A1 | 6/1996 |
| CN | 1050739 | 4/1991 |
| DE | 1 934 649 | 1/1971 |
| DE | 1934649 A | 1/1971 |
| DE | 2557056 A | 6/1977 |
| DE | 2055030 A | 10/1977 |
| DE | 2828992 B | 8/1979 |
| DE | 3318317 A1 | 11/1984 |
| DE | 3716227 | 12/1988 |
| DE | 39 01 056 A1 | 7/1990 |
| DE | 3901056 A1 | 7/1990 |
| DE | 41 39 817 A1 | 6/1993 |
| EP | 061017 A2 | 9/1982 |
| EP | 171079 A2 | 2/1986 |
| EP | 0 252 760 B1 | 1/1988 |
| EP | 254610 | 1/1988 |
| EP | 0 379 023 A1 | 7/1990 |
| EP | 496310 A | 7/1992 |
| EP | 252760 B1 | 3/1993 |
| EP | 0 574 764 A3 | 12/1993 |
| EP | 593833 A1 | 4/1994 |
| EP | 0 719 854 A2 | 7/1996 |
| EP | 721980 A3 | 7/1996 |
| EP | 0 591 981 B1 | 12/1996 |
| EP | 0 664 959 B1 | 3/1999 |
| EP | 0 943 675 A1 | 9/1999 |
| EP | 0 711 508 B1 | 7/2000 |
| FR | 1 274 872 | 10/1961 |
| GB | 341000 | 1/1931 |
| GB | 652619 | 4/1951 |
| GB | 742537 | 12/1955 |
| GB | 770843 | 3/1957 |
| GB | 1177860 A | 1/1970 |
| GB | 1356749 | 6/1974 |
| GB | 1356750 | 6/1974 |
| GB | 2033721 A | 5/1980 |
| GB | 2 148 739 A | 6/1985 |
| GB | 2 177 107 A | 1/1987 |
| JP | 53-66473 | 6/1978 |
| JP | 53066473 A | 6/1978 |
| JP | 54-157880 A | 12/1979 |
| JP | 54157880 A | 12/1979 |
| JP | 55135546 | 10/1980 |
| JP | 58-146238 A | 8/1983 |
| JP | 58146238 A | 8/1983 |
| JP | 59-91845 A | 5/1984 |
| JP | 59091845 A | 5/1984 |
| JP | 62-104554 A | 5/1987 |
| JP | 62104554 A | 5/1987 |
| JP | 62-126966 A | 6/1987 |
| JP | 62126966 A | 6/1987 |
| JP | 62272941 A | 11/1987 |
| JP | 62272941 A2 | 11/1987 |
| JP | EP0301278 * | 1/1989 |
| JP | 1056793 A | 3/1989 |
| JP | 01112965 A2 | 5/1989 |
| JP | 1243942 A | 9/1989 |
| JP | 3155748 A | 7/1991 |
| JP | 5015349 A | 1/1993 |
| JP | 06086637 A2 | 3/1994 |
| JP | 7-87892 A | 4/1995 |
| JP | 7-87893 A | 4/1995 |
| JP | 7087892 | 4/1995 |
| JP | 7087893 | 4/1995 |
| JP | 09234018 A2 | 9/1997 |
| JP | 9-275905 A | 10/1997 |
| JP | 9275905 A | 10/1997 |
| JP | 10179078 A2 | 7/1998 |
| JP | 11113495 A2 | 4/1999 |
| JP | 20125767 A2 | 5/2000 |
| JP | 11-155985 | 12/2000 |
| JP | 21069946 A2 | 3/2001 |
| SU | 210300 | 4/1968 |
| WO | WO 93/13035 | 7/1993 |
| WO | WO 94/15483 | 7/1994 |
| WO | WO 95/03708 | 2/1995 |
| WO | WO 95/10946 | 4/1995 |
| WO | WO 96/34535 | 11/1996 |
| WO | WO 01/82714 A1 | 11/2001 |
| WO | WO 02/071858 A1 | 9/2002 |
| ZA | 881378 | 2/1988 |

OTHER PUBLICATIONS

Minifie, B. W. 1993. Chocolate, Cocoa and Confectionery: Science and Technology 3rd edition. Chapman & Hall New York, p. 71-74, 85-87.*

Lees, R. 1973. Sugar Confectionery and Chocolate Manufacture. Leonard Hill Books. Great Britain, p. 130-132.*

Code of Federal Regulations. Apr. 1, 1982. 21 CFR 163.113 and 163.114, p. 388-389.*

ADM Coco, "There's a Century of Experience in Every Product", Presentation Folder and Materials.

Arruda et al., "Phospholipid Composition of Lipid Seed Crystal Isolates from Ivory Coast Cocoa Butter", JAOCS, 68(6) 385-390 (Jun. 1991).

Author Unknown, "Cadbury Schweppes' New Cocoa Processing Factory at Chirk", *Food Trade Review*, 39(11):43-46 (Nov. 1969).

Author Unknown, "New Fat Solvent System", *International Food Manufacture*, 13(4):18 (1996).

Bensdorp and Cocoa, Cocoa Powder, Cocoa Butter, Vending Machine Cocoa, Informational Booklet.
Bensdorp Cocoa/Chocolate, Defatted Powders, Holland Quality & Expertise, Booklet and Recipes.
Bensdorp, Cocoa Butter; Defatted Cocoa Powder; Production of Cocoa Powder and Cocoa Press Butter.
Bioseparations, Inc., Presentation Materials, "Speciality Grain Extraction Project" (1992).
Brochure, Pannevis, Solid Liquid Separation, Pannevis Inc., Fairfield, New Jersey.
Burger, "Sensory Evaluation Techniques for Chocolate with Different Types of Cocoa Butter Products", *The Manufacturing Confectioner*, 58-60 *(Oct. 1992).
Chaiseri et al., "Lipid and Hardness Characteristics of Cocoa Butters from Different Geographic Regions", JAOCS, 66(11): 1771-1776.
Chalseri et al., "Cocoa Butter—Its Composition and Properties", *The Manufacturing Confectioner*, 115-122 (Sep. 1987).
Clarke, "Supercritical Fluid Extraction Technology for Fat Reduction," 44th Annual Receprocal Meat Conference Proceedings, pp. 101-107 (Jun. 9-12, 1991).
*Confectionery Production*, Physical Constants of Cocoa Powder and Cocoa Butter, 425-433 (Jul. 1971).
Demetrakakes, "Sweet Charity", *Food Processing*, 87-92 (May 1997).
DeZaan, "Defatted S Helping you Make the Most of Cocoa" Brochure.
DeZaan, "Cocoa Powder Color Matrix" (1993).
ED & F Man Cocoa Limited, E D & F Man Cocoa Products, Promotional Brochure.
*Emerging Food R &D Report*, "Process defats and stabilizes rice bran and produces rice oil" (Mar. 1996).
*Federal Register*, 62 (46) 10781-10786, Department of Health and Human Services, Food and Drug Administration, 21 CFR Part 163 "White Chocolate; Proposal to Establish a Standard of Identity" (Mar. 10, 1997).
*Food Engineering*, "Removing Fat Via Liquified Gas-Solvent Extraction", pp. 27-28 (Jul./Aug. 1996).
*Food Technology*, Food Expo in Print, Aug. 1996, p. 74.
*Food Technology*, Food Expo in Print, Aug. 1996, p. 102.
Ghizzoni et al., "Composition of Volatile Fraction of Industrial Chocolate", *Italian Food & Beverage Technology*, 3-13 (Mar. 1995).
Grace Cocoa, Chocolate Americas Division, "Grace Cocoa's Solution Source for Low Fat and Low Calories for Cocoa and Chocolate Containing Products", Presentation Folder and Materials.
Hashim et al., "Extraction and determination of methylpyrazines in Cocoa Beans Using Coupled Steam Distillation-Microdistillator", *Food Research International*, 27:537 544 (1994).
Heidlas, J.E., "Propane Extraction in Food Processing", *Food Marketing & Technology*, 8(6):38-40, 42-43 (Dec. 1994).
Jackson, "Recipes", *Industrial Chocolate Manufacture and Use*, 15: 258-280 (1994).
Jeffery, "Chocolate Technology in 1997 and into the New Millenium", *The World of Ingredients*, 21-25.
Kaylegian, "Milkfat Fractions in Chocolate", *The Manufacturing Confectioner*, 79-84 (May 1997).
Keme, "Heat Treatment of Cocoa-Problems and Controlling", *The Manufacturing Confectioner*, 101-108 Jun. 1994).
LaBell, "Cocoa: A Bean of Many Flavors", *Prepared Foods*, 81 (Jul. 1997).
Lawler et al., PCMA Research Program at Penn State University, Progress Report submitted to The Research Committee of The Pennsylvania Manufacturing Confectioners Association (Apr. 28, 1996).
Lawler et al., PCMA Research Program at Penn State University, Progress Report submitted to The Research Committee of The Pennsylvania Manufacturing Confectioners Association (Nov. 7, 1995).
Lawler et al., PCMA Research Program at Penn State University, Progress Report submitted to The Research Committee of The Pennsylvania Manufacturing Confectioners Association (Apr. 23, 1995).
Li et al., "A New Industrial Process for Extracting Cocoa Butter and Xanthines with Supercritical Carbon Dioxide", JAOCS, 73(4) 423-429 (1996).
*Lipid Technology*, "New Extraction Procedure" (Jul. 1996) p. 92.
Malssen et al., "Real-Time X-Ray Powder Diffraction Investigations on Cocoa Butter.I. Temperature-Dependent Crystallization Behavior", JAOCS, 73 (10):1209-1215 (1996).
Malssen et al., "Real-Time X-Ray Powder Diffraction Investigations on Cocoa Butter.II. The Relationship Between Melting Behavior and Composition of β-Cocoa Butter", JAOCS, 73 (10):12171223 (1996).
Malssen et al., "Real Time X-Ray Powder Diffraction Investigations on Cocoa Butter. III. Direct β-Crystallization of Cocoa Butter: Occurrence of a Memory Effect", JAOCS, 73 (10): 1225-1230 (1996).
Meursing, "Cocoa Mass, Cocoa Butter, Cocoa Powder", *Industrial Chocolate Manufacture and Use* 6: 70-82 (1994).
Minife et al., "Solvent Extraction of Cocoa Butter" *Chocolate, Cocoa and Confectionery: Science and Technology*, 2:78-79.
Minson, "Chocolate Manufacture—Beans Through Liquior Production", *The Manfacturing Confectioner*, 61-67 (Nov. 1992).
Moates, et al., "Separating out the Value", *Food Science and Technology Today*, 4(4):213-214.
Morrison Knudsen Company, CF Systems, "Environmentally Sound Oil Extraction Process for the Food Industry", Promotional Brochure.
Parsons et al., "Phospholipid Concentration in Cocoa Butter and its Relationship to Viscosity in Dark Chocolate", Journal of the American of Oil Chemists' Society, 46 (8):425-4227 (1969).
Rossi et al., "Characterization of Cocoa Extracts Obtained with Supercritical Carbon Dioxide", *Ital. J. Food Sci.*, 3U: 41-50 (1989).
Schokinag, Folder and Presentation materials.
Schaughnessy, "Cocoa Beans—Planting Through Fermentation-Its Effect on Flavor", *The Manufacturing Confectioner*, 51-58 (Nov. 1992).
Shukla, "Chocolate-the Chemistry of Pleasure", *INFORM*, 8(2):152-162 (Feb. 1997).
Stockwell, "Champion Chocolate", *Ingredient Technology*, 42-46 (Jul. 1996).
Supercritical Technology Consultants, Pamphlet.
Sutter et al., "Supercritical Extraction, A New Industrial Technology", *Cienc. Tecnol. Ailiment.*, 14 (Suppl) 3-10 dez. (1994).
Talbot, "Vegetable Fats", *Industrial Chocolate Manufacture and Use*, 14:242-249 (1994).
Urbanski, "Chocolate Flavor/Origins and Descriptions The Effects of Process and Bean Source", *The Manufacturing Confectioner*, 69-82 (Nov. 1992).
Urbanski, "Cocoa Roasting", *The Manufacturing Confectioner*, 58-62 (Nov. 1989).
International Search Report, International Application No. PCT/US03/32756; mailed Mar. 30, 2004.

* cited by examiner

DISPERSIBLE COCOA PRODUCTS

BACKGROUND

Cocoa beans are processed in large volumes into a wide variety of chocolate-related products. For example, cocoa beans can be initially processed into cocoa nibs and then into cocoa liquor, which then is further processed to separate the liquor into its cocoa butter and cocoa powder constituents. To separate cocoa butter from cocoa powder, conventional mechanical pressing of the cocoa liquor is typically used. The initial result of mechanical pressing is a press cake of cocoa solids which retains residual cocoa butter. This press cake can be cooled, milled, and classified into the cocoa powder, which still contains residual cocoa butter. The amount of residual cocoa butter can be, for example, about 10–12 wt. % (so called "10/12 cocoa powder").

Cocoa powder can be used in many products. One major use, for example, is in beverages including drinking chocolate, chocolate-flavored milk, and instant drinks from vending machines and other sources. In these applications, ideally the powder should instantly disperse when mixed with a cold aqueous medium such as milk. However, cocoa powder is not easily wetted which can impede dispersion and result in lumping. The difficulty is exacerbated if the powder contains fat, such as residual cocoa butter, or if the dispersion is to take place in a cold liquid.

In the past, lecithination has been used to address this dispersibility problem. In this approach, cocoa powders have been further processed to include a dispersing agent such as lecithin, the dispersing agent acting as a surface active agent to reduce surface tension between the powder and the water-based liquid. Lecithin can be added at a level of about 5 wt. %. Government regulation may limit the amount of lecithin which can be added. Current lecithination technology, however, suffers from at least four disadvantages including:

(1) increased cost. Depending on cocoa powder prices, lecithin represents a considerable ingredient cost, particularly where customers demand GMO-free soya lecithin.

(2) inefficient delivery of the lecithin. Because current procedures for lecithination can be relatively inefficient, depending on a number of factors, high levels of lecithin are incorporated to achieve the dispersion behavior required of the cocoa powder. In addition to increasing cost, high levels of lecithin also can impart off-flavors, requiring the formulator to use more refined (and hence more expensive) versions.

(3) increased total fat. Lecithin is a fatty substance which becomes part of the total fat as reported in NLEA labeling requirements. Therefore, a 10/12 cocoa powder containing 5 wt. % lecithin will in fact display considerably higher values for total fat content and calories from fat per serving.

(4) issues concerning shelf life arise.

Hence, improved lecithination procedures are needed. Moreover, lecithination needs to be adapted to new procedures for production of cocoa powder. For example, liquefied gas extraction has been recently reported as an alternative to mechanical pressing to separate cocoa liquor into its cocoa butter and cocoa powder constituents as disclosed in, for example, U.S. Pat. Nos. 6,066,350 and 6,361,814. In a preferred embodiment of this process, cocoa liquor is mixed with liquefied, pressurized butane to form a slurry, and the slurry is subjected to separation on, for example, a belt filter. The belt filter retains wet cocoa solids as solvent passes through the belt filter extracting cocoa butter. The remaining wet cocoa solids, which usually retain some cocoa butter and forms a cocoa mass, are processed into cocoa powder by, among other things, breaking up any clumped particles and removing solvent (desolventization).

SUMMARY

The present application is directed to a novel method for processing cocoa comprising the step of adding a dispersing agent such as, for example, lecithin, to a cocoa mass comprising solvent. This results, surprisingly, in improved, more uniform mixing between the cocoa mass and the dispersing agent. Advantages include lower costs, more flexibility in choice of dispersing agents, and lower fat content. The cocoa mass can be provided by reducing the fat content of cocoa mass with use of, for example, liquefied gas extraction and a belt filter to effect separation of cocoa butter. After mixing with the dispersing agent, the cocoa mass can be desolventized to yield a cocoa powder which comprises the dispersing agent. The amount of dispersing agent in the cocoa powder can be relatively low such as, for example, only about 0.5 wt. %. If desired, the cocoa powder can be further agglomerated or instantized. In one embodiment, low calorie products are prepared. Finally, improved, dispersible cocoa powder compositions are provided which are prepared by these methods.

DETAILED DESCRIPTION

Unless otherwise indicated, the word "a" in the present application is not exclusively limited to mean "only one" but inclusively to mean "at least one."

Unless otherwise indicated, the term "cocoa mass" is used to refer to a material which includes cocoa fat and solids. One example of a "cocoa mass" would be ground cocoa nibs, before later processing, whether dutched or not. The term "cocoa liquor" is used herein to refer to cocoa mass which results from grinding cocoa nibs (whether dutched or not) but which has not been modified with respect to fat content (typically 50% or greater). Thus, as the terms are used herein, a "cocoa liquor" is one type of "cocoa mass." The term "cocoa mass" is also intended to include within its scope material that is the result of modifying cocoa liquor. The term "wet cocoa mass" as used herein refers to a material which includes cocoa fat, cocoa solids and solvent.

Unless otherwise indicated, the phrase "suitable for human consumption of a food product" means that the composition is generally recognized as safe for eating and drinking and as not being toxic, poisonous, or otherwise harmful to humans when used in functionally useful amounts in solid and liquid food products.

Unless otherwise indicated, the phrases "uniform mixing" or "uniformly mixed" means that the majority of particles are coated with at least some dispersing agent.

Unless otherwise indicated, "functionally useful fast dispersion" means that an individual consumer is able to rapidly, in seconds, disperse the cocoa powder in the aqueous media without lumping by stirring with gentle shaking or a conventional stirring device such as a spoon or plastic rod.

Background references disclosing cocoa technology include, for example, *Industrial Chocolate Manufacture and Use*, $2^{nd}$ Ed., Ed. S. T. Beckett, Blackie Academic, 1994; and *Chocolate, Cocoa, and Confectionery: Science and Technology*, $3^{rd}$ Ed., B. Minifie, Van Nostrand, 1989. For example, these references discuss methods for converting raw cocoa products into cocoa mass and cocoa liquor.

A liquor extraction process can be carried out with liquid solvent, wherein the solvent is either a liquid or gas at room temperature and pressure (RTP). Liquid solvents at RTP include $C_6$–$C_8$ saturated alkanes such as, for example, hexane, including n-hexane and all isomers thereof (e.g., iso-hexane). If the solvent is a gas at RTP, the solvent is liquefied before extraction. The liquefied solvent can be, for example, saturated hydrocarbons including propane, butane, pentane, and all isomers thereof including n-butane, isobutane, n-propane, n-pentane, and isopentane. For example, the solvent can comprise at least 90% by wt. butane. Solvent molecular weight can be below 75. In addition, organic solvents such as, for example, esters and ketones and other oxygenated solvents can be used such as, for example, ethyl acetate.

Multiple references disclose liquefied gas extraction of cocoa liquor to separate cocoa butter from cocoa powder including, for example, U.S. Pat. Nos. 6,066,350; 6,361,814; and U.S. Patent Application Publication 2002/0006459 A1. These three references are incorporated herein by reference. The cocoa mass can be alkalized or non-alkalized depending on the desired application.

Conventional cocoa liquor particle sizes and distributions can be used, although relatively fine particle sizes are generally better such as, for example, mean particle sizes of about 7 microns to about 12 microns. More finely ground particle sizes can be generally useful for preparing cocoa powders having less than 1 wt. % remaining cocoa butter. In general, the particle size of the cocoa powder can be determined by the particle size of the cocoa liquor. Particle size distribution can be controlled to minimize formation of large particles and to avoid a gritty feel in the cocoa powder. Typically, 99.5% of the particles should pass through a 200 mesh screen, which means that the particles are smaller than 75 microns. Particle size distribution can be measured by methods known in the art including use of a laser defraction analyzer wherein cocoa liquor is suspended and sonicated in soybean oil in a container and then circulated over the cuvet/vial at an instrument detector. Measurements can be carried out with a Sympatec Helos-KA instrument using a low focal length lens (100 mm) when the cocoa particles consist mainly of fines. A typical cocoa powder has a steep bell-shaped curve with a mean size centered between 7–12 microns, and particle "tails" down to 0.1 micron and above 75 micron. Cocoa particle size distribution depends on parameters including grinding (e.g. combination of blade, stone, and ball mills), residence time, screening, and scalping and recycling of "overs."

Coarse grind or flake cocoa mass can be used, although in general further grinding may be preferable.

Different types of mixers can be used to promote mixing between solvent and a cocoa mass, such as cocoa liquor. For example, static, passive, in-line, or dynamic mixers can be used to promote mixing. Fast mixing times before separation are preferred such as, for example, less than 120 seconds, including 30–110 seconds. Fast mixing can be achieved with use of, for example, static mixers including those available from Kenics.

The temperature after mixing can be, for example, 10–34° C., or alternatively, 35–60° C. In the latter temperature range, the cocoa butter is more fully softened and melted, which reduces liquor viscosity. However, the lower temperatures of the former range can provide advantages such as reduced operating pressure. Pressures can be adapted to keep solvent in the liquid or liquefied state.

In addition, the separation can be carried out with devices including, for example, a belt filter or centrifugation. Mixing and separation steps can be carried out continuously or batch-wise, although continuous operations are preferred.

The separation process results in cocoa mass which is wet with residual solvent which had been used to extract out the cocoa butter. In other words, in a typical application, cocoa liquor is defatted with the solvent to provide the cocoa mass wet with solvent. The wet cocoa mass can be removed from the separation medium for further processing and conversion to cocoa powder.

The dispersing agent which is added to the wet cocoa mass can be one or more conventional dispersing agents suitable for human consumption of food products, including drinks and chocolate products, when used in functionally useful amounts. It can function as an emulsifier, a surface active agent, and/or a wetting agent and generally improves dispersibility in aqueous media, such as cold and/or hot water and milk. The dispersing agent can be non-ionic or ionic, including anionic or cationic. It can be natural or synthetic, and preferably is relatively inexpensive. The dispersing agent can have both lipophilic and hydrophilic properties because of its molecular structure. Also, it can be in the form of a liquid, oil, or solid. It can have the capacity to be tightly bound to the particles of cocoa solids. Mixtures of dispersing agents can be used. Carriers for the dispersing agent may also be used.

The dispersing agent can be an esterified glycerol derivative, wherein the derivative is at least partially esterified with fatty acids and/or phosphate. The dispersing agent can be a monoglyceride, a diglyceride, or a triglyceride. General types of dispersing agents include surface active lipids, phospholipids, glycolipids, sorbitan esters of long chain saturated fatty acids, lactic acid or diacetyl tartaric acid esters of long chain saturated fatty acid monoglycerides, bile acids and salts including chenodeoxycholic acid derivatives, secondary deoxycholic acid derivatives, cephalin, plasmologens, animal or plant sterols, and phenolic and/or sucrose esters of long chain fatty acids.

In particular, the dispersing agent can be a lecithin-related compound including lecithin, modified lecithin, fractionated lecithin, as well as vegetable lecithin derived from vegetable sources such as, for example, soybean, safflower, corn, peanut, cotton seed, and rapeseed. Egg lecithin and deoiled lecithin can also be used. Chapter 4 of the Minifie text cited above discloses use of emulsifiers, including lecithin, in chocolate confectionary coatings and cocoa, and is hereby incorporated by reference. These emulsifiers can be used as dispersing agent. Soya lecithin, in particular, has many desirable qualities.

Chemical lecithin, which is phosphatidyl choline, is the main constituent of vegetable lecithin and can be used as dispersion agent. Page 112 of the above-noted Minifie text discloses that the approximate composition of commercial lecithin comprises the following ingredients: soyabean oil, phosphatidyl choline, phosphatidyl ethanolamine, inositol phosphatides, other phospholipids and polar lipids, carbohydrates including sterol glucoside, inositol, choline, tocopherol, biotin, folic acid, thiamin, riboflavin, pantothenic acid, pyridoxine, and niacin. The ingredients of lecithin can vary with the type of lecithin, as known to those skilled in the art.

Fractionated and modified vegetable lecithins are also known and can be used as dispersing agent. Lecithins can be modified to improve their hydrophilic properties. For example, hydroxylated lecithins can be prepared by treatment with hydrogen peroxide and lactic and acetic acid, which improves their hydrophilic properties. Modified lecithins can be used in conjunction with mono- and diglycerides. Fractionation of lecithin can be carried out by extraction of natural lecithin with alcohol to provide concentrates. Fractionated lecithins enriched in either phosphatidyl choline or phosphatidyl ethanolamine, or both can be used. Carriers can be added to these concentrates depending on their use. Carriers include, for example, cocoa butter or other vegetable oil and propylene glycol.

In addition to lecithin-related dispersing agents, synthetic phospholipids are also known and can be used as dispersing agent, and include one developed by Cadbury and called "YN." YN is prepared from rapeseed oil and comprises ammonium salts of phosphatidic acids. In addition to YN, other phosphatides and complex glycerides can be used as dispersing agent including emargol which is 1-mono-stearin-3 monosodium sulphoacetate; phosphated monoglycerides; sucrose esters including sorbitan stearates such as sorbitan monostearate; polysorbate 60; and polyglyceryl ricinoleate, which is a partial polyglyceryl ester of interesterified castor oil fatty acids.

Still further, other types of dispersing agents which can be used include mono- and digylcerides; diacetyl tartaric acid esters of mono- and diglycerides (also referred to as DATEM); monosodium phosphate derivatives of mono- and diglycerides of edible fats or oils; lactylated fatty acid esters of glycerol and propylene glycol; polyglycerol esters of fatty acids; propylene glycol mono- and di-esters of fats and fatty acids; oat extract; mono-diglyceride; 2-stearoyl lactylate, the sodium or calcium salts thereof, and sucrose acetate isobutylate (SAIB) alone or in combination; sucrose esters such as sucrose dipalmitate; calcium-stearoyl lactoyl lactate; sorbitan monopalmitate; propylene glycol monostearate; and carrageenan, which is a polymeric saccharide derived from seaweed. Carrageenan can be used to prepare stabilized cocoa used for the production of chocolate milk. The carrageenan can prevent the cocoa from settling in the bottles or cartons.

In addition, the form of the dispersing agent is not limited to the extent facile processing is possible and the advantages of the present method can be achieved. Forms can be used which promote good adherence of the dispersing agent to the cocoa particles including cocoa butter. The dispersing agent can be, for example, in solid, oil, paste, syrup, slurry, or liquid form when it is added to the cocoa mass. The dispersing agent can be, for example, first dissolved in a solvent or carrier before adding to the wet cocoa mass. If desired, the carrier solvent can be the same solvent as the solvent present in the wet cocoa mass, such as, for example, liquefied butane. The dispersing agent can also be in the form of a mixture with a liquid carrier. For example, soya lecithin can be a mixture of phosphatides and soya oil, or the soya oil can be removed and the phosphatides redissolved in cocoa butter or other vegetable oil. In general, phosphatides can be used in conjunction with several percent oil to prevent deterioration and oxidation. In addition to solvents and carriers, temperature can also be used to control the form of the dispersing agent.

A distinction between a solvent and a carrier is that solvent will be removed during desolventization, discussed further below, whereas a carrier is not necessarily removed because it is generally less volatile.

The wet cocoa mass, to which the dispersing agent is added, typically comprises no more than about 30 wt. %, and more particularly, no more than about 20 wt. %, and more particularly no more than about 10 wt. %, and more particularly no more than about 5 wt. %, and even more particularly no more than about 1 wt. % solvent when mixed with the dispersing agent. The amount of solvent present can be sufficient to permit uniform mixing of the cocoa solids particles and the dispersing agent. For example, it can be at least about 0.01 wt. %, and more particularly, at least about 0.1 wt. %, and more particularly, at least about 1 wt. %. After addition of the dispersing agent, the wet cocoa mass may include about 0.1 wt. % to about 75 wt. % solvent, and more particularly, about 5 wt. % to about 35 wt. % solvent.

A variety of methods can be used to carry out the initial addition of dispersing agent to wet cocoa mass, and then also provide for uniform mixing of cocoa mass and dispersing agent once contact of the two components are achieved. Methods for contacting the cocoa mass with dispersing agent for subsequent mixing include injecting, spraying, and other conventional methods. The dispersing agent can be added either straight, in a liquid state, or predissolved, dispersed in solvent. Methods for mixing the two components, after initial contact, include tumbling, grinding, breaking, stirring, agitating, pulverizing, tempering, refining, sifting, milling, and other conventional methods. The pressure during mixing of wet cocoa mass and dispersing agent can be sufficient to keep the solvent in a liquefied state. The temperature during mixing can be, for example, about 15–60° and more particularly, about 20–50° C.

The mixing of cocoa mass and dispersing agent can also be done in conjunction with processes to convert the cocoa solids in the mass into a fine powder. For example, because of the cocoa butter present in the cocoa mass, cooling of the mass may be required during any processing by grinding so that the butter does not melt and cause particles to adhere and machinery to clog.

Injecting is a preferred method for adding the dispersing agent to the wet coca mass, which can be if desired further tumbled.

Mixing can result in substantially complete or complete coverage of the particle surfaces with the dispersing agent. Surface coverage can be uniform. IR and/or Raman methods, for example, can be used to analyze the uniformity of mixing.

After mixing with dispersing agent, the cocoa mass can be further processed and desolventized to yield cocoa powder mixed with dispersing agent. The amount of residual solvent in the cocoa powder produced by desolventizing, can be, for example, no more than about 250 ppm, and more particularly, no more than about 100 ppm, and more particularly, no more than 50 ppm, and more particularly no more than about 5 ppm, and more particularly, no more than 1 ppm. Residual solvent can be analyzed by head space recovery and gas chromatography.

Desolventizing can be achieved by conventional methods including reducing pressure, vacuum, heating, and sparging with gas such as, for example, nitrogen. Heating to temperatures of 60° C. to 70° C., including about 65° C., can be done. Vacuum can be pulled at constant temperature. Desolventizing can result in further mixing of the dispersing agent and cocoa mass if, for example, mixers or agitators are used.

Conventional complementary ingredients can be included with the cocoa powder if desired. For example, the cocoa powder also can be mixed with sweetening agents such as, for example, natural sweeteners such as, for example, sugars such as sucrose, sugar alcohols such as xylitol, sorbitol, erythritol, artificial sweeteners such as, for example, saccharin and aspartame, sodium cyclamate, and mixtures of sodium cyclamate and saccharin. Other examples include acesulfame-k, alitame, and sucralose. Mixtures can be used. Milk powders also can be used. Other examples of complementary ingredients include vitamins, trehalose, colors, flavors, and bulking agents. Complementary ingredients can be selected to be compatible with the solvent.

Upon desolventization, the cocoa powder can comprise no more than about 25 wt. %, and more particularly, no more than about 12 wt. % cocoa butter, and more particularly, no more than about 8 wt. % cocoa butter, and more particularly, no more than about 2 wt. % cocoa butter, and more particularly, no more than about 1 wt. % cocoa butter, and particularly, no more than about 0.1 wt. % cocoa butter. One range of remaining cocoa butter in the cocoa powder is about 9 wt. % to about 13 wt. %, or more particularly, about 10 wt. % to about 12 wt. %. Another example is so-called breakfast cocoa powder having cocoa butter content of 22–23 wt. %. Water content can be, for example, less than about 2.5 wt. %. In measuring cocoa butter content in the cocoa powder in wt. %, the amount of dispersing agent is excluded. The amount of solvent is also excluded in measuring the amount of cocoa butter as solvent is substantially removed upon desolventization. The amount of cocoa butter remaining in the cocoa powder can be measured by soxhlet extraction methods known to those skilled in the art.

Upon desolventization, the amount of dispersing agent in the cocoa powder is typically no more than about 10 wt. %, and more particularly, no more than about 7 wt. %, and more particularly, no more than about 5 wt. %, and more particularly, no more than about 2 wt. %, and more particularly, no more than about 1 wt. %, and more particularly, no more than about 0.5 wt. %. The dispersing agent amount can be, for example, sufficient to provide functionally useful fast dispersion of the cocoa powder in aqueous media. If too high, however, off flavor can develop. The amount can be, for example, at least about 0.1 wt. %, and more particularly, at least about 0.3 wt. %. The selected amount of dispersing agent can be a function of such factors as, for example, the amount of residual cocoa butter, whether the cocoa powder is alkalized, and the particular food application. After removal of solvent, the sum of the cocoa butter content in wt. percent and the amount of dispersing agent in weight percent in the cocoa powder may be less than about 5 wt. %.

When calculating the amount of dispersing agent, the percentage of active dispersing agent in the added composition can be considered. For example, commercial natural lecithins, such as the soya lecithin, contain about 65 to about 70 wt. % of the active phospholipid. The remainder is oil natural to the source material, or it may be replaced by cocoa butter or a refined vegetable oil, and does not function as a dispersing agent. In calculating the amount of dispersing agent present, particularly with commercial lecithin, it is common practice to use the total added weight including the amount of carrier oil as dispersing agent. As employed herein, however, the "amount of dispersing agent" refers only to the amount of components which are functionally active as a dispersing agent and does not include the amount of any carrier which may be present, such as in commercially available forms of certain dispersing agents.

The cocoa powders provided herein are commonly completely capable of being dispersed in aqueous media with simple stirring with, for example, a spoon, or with moderate shaking without formation of sticky lumps. The cocoa powder also can be free flowing and can typically be poured without plugging or dusting.

Cocoa powder can be made from cocoa liquor prepared from cocoa beans which have only been roasted, i.e., from non-alkalized (non-solubilized) cocoa. In this case, the powder which is formed is referred to as natural process cocoa. However, to provide an attractive color and good dispersion characteristics in, for example, milk, cocoa powder is often made from alkalized cocoa mass.

The cocoa powders can be checked for quality including checked for color, flavor, fat percentage, moisture percentage, pH, ash on fat-free dry, alkalinity of the ash, shell percentage based on nib, percentage sieve residue on 75 microns, traces of heavy metals, pesticide residues, and microbiology.

The improved lecithination, as described above, can be combined with the process of "instantizing," known to those skilled in the art, which joins the fine particles into agglomerates which contain tiny capillary channels which allow liquid to be drawn in, thereby producing a wetting action. Agglomeration also can affect the bulk density so that the material has a greater volume for a given weight. Cocoa powder, for example, can be agglomerated with sugar and milk powder to produce instant beverages. Instantizing is disclosed in, for example, U.S. Pat. No. 2,835,586, which is hereby incorporated by reference.

The dispersibility of the cocoa powder can be assessed based on testing methods known in the art which include the following:

(1) the time required for a predetermined amount of cocoa powder to penetrate the surface of a beverage such as, for example, cold milk or water without mixing. This measurement reflects wettability.

(2) the rate and extent of cocoa sedimentation, as visualized by the formation of bottom sediment.

(3) the presence of cocoa particles that remain on the surface (which can be called "floaters");

(4) the formation of a surface layer resulting from cocoa butter which "oils off" and rises after a hot beverage is left to stand.

Factors (2)–(4) can be related to product defects as well.

In one embodiment, the dispersible powder composition can be formulated to be relatively low in calories. For example, the amount of cocoa butter can be reduced and low or no calorie sweeteners can be used.

In a low calorie embodiment, reducing the amount of cocoa butter content generally improves dispersibility, particularly when cocoa butter content is reduced to about 1 wt. % or less. When the amount of cocoa butter content is relatively high, then the dispersing agent becomes more important in providing good dispersibility.

When the dispersing agent is mixed with a carrier solvent such as hexane, for example, the amount of carrier solvent can be adapted based on the scale-up process parameters. For example, in some embodiments, the relative amount of carrier solvent can be reduced as the process is scaled up.

WORKING EXAMPLES

A mix was prepared by agglomeration of 80% powdered sugar and 20% alkalized cocoa powder, wherein the latter was prepared by a liquefied butane extraction of cocoa mass to reduce the cocoa buffer content to less than 1 wt. %. The wettability of this agglomerated product was analyzed by pouring dry agglomerate on the surface of cold fresh milk. The wettability time is the time needed for the powder to sink through the surface without agitation. The dispersability was evaluated in cold milk by adding 15 g to 200 mL milk at 70° C.±1° C. The wettability of cocoa powders produced by the present method may be no more than about 20 seconds, and more particularly, no more than about 15 seconds, and more particularly, no more than about 10 seconds.

Experiment 1

A. The cocoa powder product which had not been modified with lecithin almost completely sank through the surface of cold milk in 30 seconds.

B. The same cocoa powder product as in A which had been modified with lecithin at a level of 0.5 wt. % sank through the surface of cold milk in 15 seconds. Lecithin modification was carried out with use of hexane as a carrier solvent, which is removed by evaporation.

C. The same cocoa powder product as in A which had been modified with lecithin at a level of 1.0 wt. % sank through the surface of cold milk in 8 seconds. Again, lecithin modification was carried out with use of hexane as a carrier solvent, which is removed by evaporation.

Experiment 2

A conventional cocoa powder was used having 10–12 wt. % remaining cocoa butter. Lecithin was added with use of hexane as a carrier solvent. It was converted to a 80:20 agglomerated powder sugar:cocoa powder mix. The dispersability was evaluated in cold milk by adding 15 g to 200 mL milk at 7° C.±1° C.

When no lecithin was added, the powder remained on the surface of cold milk; it did not sink through the surface of cold milk. At 0.5 wt. % lecithin added, only 5 percent of the dry mix is wetted; 95% was still dry on the surface of cold milk after 30 seconds. At 1 wt. % lecithin added, only 30 percent of the dry mix is wetted; 70% was still dry on the surface of cold milk after 30 seconds. At 5 wt. % lecithin added, the mix sank through the surface of the cold milk in 8 seconds.

Although illustrated and described herein with reference to certain specific embodiments and examples, the present process is nevertheless not intended to be limited to the details shown. Rather, various modifications may be made in the details within the scope and range of equivalents of the claims and without departing from the spirit of the process.

What is claimed is:

1. A method for processing cocoa comprising:
   decreasing fat content in a cocoa mass with a solvent to provide a reduced cocoa fat cocoa mass comprising a portion of the solvent;
   adding a dispersing agent to the reduced fat cocoa mass to provide a second reduced fat cocoa mass, and;
   desolventizing the second reduced fat cocoa mass to provide cocoa powder mixed with the dispersing agent;
   wherein the solvent includes a saturated hydrocarbon.

2. The method according to claim 1, wherein prior to the adding step the cocoa mass comprising solvent is provided by decreasing fat content in a cocoa mass with the solvent.

3. The method according to claim 1, wherein the decreasing fat content in the cocoa mass is carried out with use of a static mixer and a belt filter.

4. The method according to claim 1, wherein the cocoa mass is desolventized with use of heating or vacuum or a combination thereof.

5. The method according to claim 1, wherein the decreasing fat content in the cocoa mass is carried out with use of a static mixer and a belt filter, and wherein the cocoa mass is desolventized with use of heating or vacuum or a combination thereof.

6. The method according to claim 1, wherein the solvent has a molecular weight of less than 75.

7. The method according to claim 1, wherein the dispersing agent is in liquid form when it is added to the cocoa mass.

8. The method according to claim 1, wherein the dispersing agent is added when in a solvent.

9. The method according to claim 1, wherein the dispersing agent is added when in a carrier.

10. The method according to claim 1, wherein the dispersing agent is suitable for human consumption of a food product.

11. The method according to claim 1, wherein the dispersing agent includes an ionic dispersing agent.

12. The method according to claim 1, wherein the dispersing agent includes a phospholipid.

13. The method according to claim 1, wherein the dispersing agent includes phosphatidyl choline.

14. The method according to claim 1, wherein the dispersing agent includes lecithin.

15. The method according to claim 1, wherein the dispersing agent includes modified lecithin.

16. The method according to claim 1, wherein the dispersing agent includes fractionated lecithin.

17. The method according to claim 1, wherein the dispersing agent includes vegetable lecithin.

18. The method according to claim 1, wherein the dispersing agent includes soya lecithin.

19. The method according to claim 1, wherein the cocoa mass comprises about 0.1 wt. % to about 75 wt. % solvent after the dispersing agent is added to the cocoa mass.

20. The method according to claim 1, wherein the cocoa mass comprises about 5 wt. % to about 35 wt. % solvent after the dispersing agent is added to the cocoa mass.

21. The method according to claim 1, wherein the adding step further comprises tumbling, grinding, breaking, stirring, agitating, pulverizing, tempering, refining, sifting, milling, or a combination thereof the cocoa mass comprising solvent and the dispersing agent.

22. The method according to claim 1, wherein upon desolventization the cocoa powder comprises no more than about 25 wt. % cocoa butter.

23. The method according to claim 1, wherein upon desolventization the cocoa powder comprises no more than about 8 wt. % cocoa butter.

24. The method according to claim 1, wherein upon desolventization the cocoa powder comprises no more than about 1 wt. % cocoa butter.

25. The method according to claim 1, wherein upon desolventization the cocoa powder comprises about 9 wt. % to about 13 wt. % cocoa butter.

26. The method according to claim 1, wherein upon desolventization the amount of dispersing agent in the cocoa powder is about 0.1 wt. % to about 10 wt. %.

27. The method according to claim 1, wherein upon desolventization the amount of dispersing agent in the cocoa powder is no more than about 5 wt. %.

28. The method according to claim 1, wherein after desolventization the cocoa powder is instantized.

29. The method according to claim 1, wherein the dispersing agent is lecithin, wherein the amount of dispersing agent in the cocoa powder is sufficient to provide functionally useful fast dispersion of the cocoa powder in aqueous media and is less than about 2 wt. %, and wherein the amount of cocoa butter in the cocoa powder is less than about 1 wt. %.

30. A method for preparing an aqueous composition from cocoa powder comprising the step of dispersing an agglomerated composition comprising the cocoa powder in aqueous medium, wherein the cocoa powder is prepared according to claim 1.

31. A method for processing cocoa comprising:
  decreasing fat content in a cocoa mass with a solvent to provide a reduced cocoa fat cocoa mass comprising the solvent;
  adding a dispersing agent to the reduced fat cocoa mass to provide a second reduced fat cocoa mass; and
  desolventizing the second reduced fat cocoa mass to provide cocoa powder mixed with the dispersing agent;
  wherein the dispersing agent includes an esterified glycerol derivative and the solvent includes a saturated hydrocarbon.

32. The method according to claim 31, wherein the dispersing agent includes an esterified glycerol derivative which is at least partly esterified with one or more fatty acids.

33. The method according to claim 31, wherein the dispersing agent includes an estenfied glycerol derivative which is at least partly esterified with phosphate.

34. A method of improving the dispersibility of a liquefied gaseous solvent-extracted cocoa powder in aqueous media comprising the steps of:
  reducing the fat content of cocoa mass with liquefied gaseous solvent to provide cocoa mass comprising solvent and cocoa butter, wherein reducing the fat content comprises solvent extraction of the cocoa mass with solvent to form a slurry followed by separation of cocoa mass comprising cocoa butter from the slurry,
  mixing the cocoa mass with a dispersing agent to yield cocoa mass comprising solvent, cocoa butter, and dispersing agent, and
  desolventizing the cocoa mass to provide cocoa powder comprising dispersing agent and cocoa butter, wherein the amount of cocoa butter in the cocoa powder is no more than about 20 wt. % and the amount of the dispersing agent in the cocoa powder is no more than about 10 wt. %.

35. The method according to claim 34, wherein the amount of solvent in the cocoa mass after reducing the fat content but before desolventizing is sufficient to provide uniform mixing of the cocoa mass and the dispersing agent.

36. The method according to claim 34, wherein the amount of solvent in the cocoa mass after reducing the fat content but before desolventizing is at least about 0.1 wt. %.

37. The method according to claim 34, wherein the amount of dispersing agent in the desolventized cocoa powder is no more than about 5 wt. %.

38. The method according to claim 34, wherein the amount of dispersing agent in the cocoa powder is no more than about 2 wt. % and is sufficient to provide functionally useful cocoa powder.

39. The method according to claim 34, wherein the amount of cocoa butter in the cocoa powder is no more than 1 wt. %.

40. The method according to claim 34, wherein the dispersing agent includes a phospholipid.

41. The method according to claim 34, wherein the dispersing agent includes an esterified glycerol derivative.

42. The method according to claim 34, wherein the dispersing agent includes lecithin.

43. The method of claim 34, wherein the liquefied gaseous solvent includes saturated hydrocarbon.

44. A method for processing cocoa comprising the step of adding a solution or suspension of dispersing agent with cocoa powder, wherein the cocoa powder has a cocoa butter content of less than about 2 wt. %, and the solution or suspension includes a saturated hydrocarbon.

45. The method according to claim 44, wherein the dispersing agent is a lecithin dispersing agent and the agent is in the form of an alkane solution or suspension which includes a saturated hydrocarbon having a molecular weight of less than 75.

46. A dispersible cocoa powder composition consisting essentially of:
  cocoa powder having a cocoa butter content; and
  a dispersing agent for dispersing the cocoa powder in aqueous media, the dispersing agent being mixed throughout the cocoa powder;
  wherein the sum of the cocoa butter content in wt. percent and the amount of dispersing agent in weight percent is no more than about 5 wt. % of the dispersible cocoa powder composition; and
  an agglomerated mixture formed from the dispersible composition has a wettability of no more than about 20 seconds; wettability being measured by agglomerating the dispersible composition with powdered sugar at a ratio of 80 wt. % powdered sugar and 20 wt. % of the dispersible composition to form the agglomerated mixture; adding 15 g of the agglomerated mixture to 200 mL milk at 70° C.; and determining the time needed for the agglomerated mixture to sink through the milk surface without agitation.

47. The composition according to claim 46 wherein the sum of the cocoa butter content in wt. percent and the amount of dispersing agent in weight percent is no more than about 2 wt. % of the dispersable cocoa powder composition.

48. The composition according to claim 46 wherein the cocoa powder has a cocoa butter content of no more than about 2 wt. %.

49. The composition according to claim 48, wherein the amount of dispersing agent is no more than about 2 wt. %.

50. The composition according to claim 46 wherein the wettability is no more than about 10 seconds.

51. The composition according to claim 46 wherein the amount of dispersing agent is no more than about 2 wt. %.

52. A method for processing cocoa comprising:
  extracting cocoa mass with solvent to provide cocoa mass having a reduced cocoa butter content and comprising solvent; wherein the solvent comprises a saturated hydrocarbon in a liquid or liquefied state;
  adding a dispersing agent to the cocoa mass with the reduced cocoa butter content; and
  after the adding step the cocoa mass is desolventized to yield cocoa powder mixed with dispersing agent;
  wherein the desolventized cocoa powder comprises no more than about 25 wt. % cocoa butter and no more than about 5 wt. % of the dispersing agent.

53. The method of claim 52, wherein the dispersing agent includes phospholipid.

54. A method for processing cocoa comprising:
  extracting cocoa mass with solvent to provide a mixture comprising cocoa solids and the solvent; wherein the solvent comprises a saturated hydrocarbon in a liquid or liquefied state;
  adding a dispersing agent to the mixture; and
  after the adding step desolventizing the mixture, which includes the dispersing agent, to yield cocoa powder mixed with dispersing agent;
  wherein the cocoa powder comprises about 9 wt. % to about 13 wt. % cocoa butter and no more than about 5 wt. % of the dispersing agent.

55. The method of claim 54, wherein the solvent includes at least 90 wt. % n-butane; and the dispersing agent includes lecithin.

56. A method for processing cocoa comprising:

extracting cocoa mass with solvent with use of a static mixer and a belt filter to provide a process stream comprising cocoa solids and solvent;

adding a dispersing agent to the process stream comprising cocoa solids and solvent to provide a second process stream; wherein the second process stream comprises no more than about 30 wt. % solvent; and desolventizing the second process stream with use of heating and vacuum to yield cocoa powder mixed with the dispersing agent;

wherein the cocoa powder includes no more than about 12 wt. % cocoa butter and no more than about 5 wt. % of the dispersing agent.

57. The method of claim 56, wherein the solvent includes at least 90 wt. % liquefied butane; and the dispersing agent includes lecithin.

58. The dispersible cocoa powder composition of claim 46 wherein the cocoa butter content is no more than about 2 wt. %; the dispersible composition contains no more than about 2 wt. % of the dispersing agent; and the wettability is no more than about 15 seconds.

59. The method of claim 56, wherein the solvent comprises a saturated hydrocarbon in a liquid or liquefied state.

60. The method of claim 56, wherein the dispersing agent includes an esterified glycerol derivative.

61. A dispersible cocoa powder composition consisting essentially of:

cocoa powder having a cocoa butter content of no more than about 2 wt. %; and a dispersing agent for dispersing the cocoa powder in aqueous media, wherein the dispersing agent is mixed throughout the cocoa powder and the amount of dispersing agent is no more than about 2 wt. % of the dispersible composition;

wherein an agglomerated mixture formed from the dispersible composition has a wettability of no more than about 10 seconds; wettability being measured by agglomerating the dispersible composition with powdered sugar at a ratio of 80 wt. % powdered sugar and 20 wt. % of the dispersible composition to form the agglomerated mixture; adding 15 g of the agglomerated mixture to 200 mL milk at 70° C.; and determining the time needed for the agglomerated mixture to sink through the milk surface without agitation.

62. A dispersible cocoa powder composition consisting essentially of:

cocoa powder having a cocoa butter content of no more than about 2 wt. % and a dispersing agent;

wherein an agglomerated mixture formed from the dispersible composition has a wettability of no more than about 20 seconds; wettability being measured by agglomerating the dispersible composition with powdered sugar at a ratio of 80 wt. % powdered sugar and 20 wt. % of the dispersible composition to form the agglomerated mixture; adding 15 g of the agglomerated mixture to 200 mL milk at 70° C.; and determining the time needed for the agglomerated mixture to sink through the milk surface without agitation.

63. The dispersible cocoa powder composition of claim 62, wherein the dispersible composition contains no more than about 2 wt. % of the dispersing agent.

64. The dispersible cocoa powder composition of claim 62, wherein the wettability is no more than about 10 seconds.

* * * * *